United States Patent Office 3,406,142
Patented Oct. 15, 1968

3,406,142
ACYCLIC DIENOPHILE CURE OF LOW UNSATURATED POLYMERS
Roger S. Hawley, Cranford, N.J., assignor to Esso Research and Engineering Company, a corporation of Delaware
No Drawing. Filed June 1, 1965, Ser. No. 460,482
23 Claims. (Cl. 260—41.5)

ABSTRACT OF THE DISCLOSURE

An improved method for curing halogenated low unsaturated synthetic rubbery materials which comprises curing said rubbers with an acyclic alpha-beta-unsaturated carbonyl dienophile and a heavy metal oxide; said curing technique being suitable for preparing improved laminated articles comprising said halogenated rubbers bonded to high unsaturated rubbers.

---

This invention relates to an improved method for curing halogenated, low unsaturated synthetic rubbery materials, e.g., halogenated butyl rubber and halogenated ethylene-propylene-diene terpolymers; relates to an improved method for curing blends of halogenated, low unsaturated synthetic rubbers and high unsaturated rubbers; and also relates to the novel compositions produced thereby. The present invention further relates to improvements in laminated articles and particularly relates to the bonding and/or lamination of said halogenated, low unsaturated synthetic rubbery materials, or blends thereof, to high unsaturated rubbers, e.g., natural rubber, butadiene-styrene (SBR) rubber, polybutadiene, etc. More particularly, this invention relates to the curing of halogenated butyl rubber with an acyclic α,β-unsaturated carbonyl dienophile and a heavy metal oxide.

Still more particularly, this invention relates to the curing of chlorinated butyl rubber with a system comprising a heavy metal oxide selected from the group consisting of zinc oxide, zinc peroxide and cuprous oxide and an acyclic α,β-unsaturated carbonyl dienophile selected from the group consisting of:

(a)
$$R-CH=CH-\overset{O}{\underset{\|}{C}}-CH=CH-R$$

wherein each R is selected from the group consisting of hydrogen, $C_1-C_{18}$ alkyl, and $C_6-C_{10}$ aryl;

(b)
$$R-C\equiv C-\overset{O}{\underset{\|}{C}}-C\equiv C-R$$

wherein each R is the same as in (a);

(c)
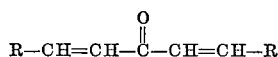

wherein R' is selected from the group consisting of hydrogen, $C_1-C_{18}$ alkoxy, $C_2-C_{10}$ alkenyl, $C_1-C_{18}$ alkyl, $C_6-C_{10}$ aryl and —OM, wherein M is a univalent alkali metal; R" is selected from the same group as R' plus hydroxyl; and each $R_1$ is selected from the group consisting of hydrogen, $C_1-C_{18}$ alkyl, $C_6-C_{10}$ aryl, and $C_1-C_{18}$ alkoxy;

(d)
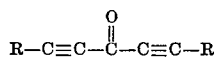

wherein R' and $R_1$ respectively are the same as in (c);

(e)
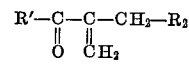

wherein R' is the same as in (c), and $R_2$ is selected from the group consisting of hydrogen, $C_1-C_{18}$ alkyl, formyl, $C_6-C_{10}$ aryl and carbo-$(C_1-C_{18})$ alkoxy; and (f)
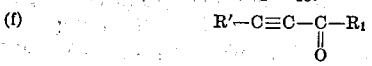

wherein R' and $R_1$ repressectively are the same as in (c). This invention is particularly applicable to the bonding of a halogenated butyl rubber tread to an auto tire carcass made of natural rubber, SBR, or blends thereof.

In the fabrication of various rubber articles, such as conveyor belts and automotive tires, it is frequently desirable to make one portion of the article from one type of rubber and the other portion from some other type of rubber. An example of the foregoing type of bonding between dissimilar rubbery materials is the production of pneumatic tires. Here, it is necessary to form an adequate and firm bond between inner linings, treads or sidewalls, prepared from a relatively low unsaturated rubber, e.g., butyl rubber, and a high unsaturated rubbery material, such as diene-styrene copolymers, natural rubber, other high unsaturated rubbers, and mixtures thereof, from which the carcass is ordinarily prepared.

Natural rubber, SBR rubber, acrylonitrile-butadiene (NBR) rubber and other high unsaturated rubbers differ greatly from butyl rubber in their chemical and physical properties as well as in their respective reactions to compounding, filling and vulcanizing agents. It is virtually impossible to adhere these dissimilar rubbery materials securely to each other by conventional methods used in laminating rubberlike materials having similar properties. This is probably due to the fact that high unsaturated rubbers tend to react preferentially with the vulcanizing agents, thus robbing the butyl of its curatives. The result is an undercured layer of butyl rubber next to an overcured layer of high unsaturated rubber. This is reflected by poor bonds in laminated structures, sponging or blowing in blend vulcanizates and delamination under dynamic stress.

Many attempts have been made to adhere chlorinated butyl rubber inner liners to tire carcasses containing high unsaturated rubbery polymers and copolymers by means of a single tie gum. For instance, the use of layers containing blends of 15-85 wt. percent of high unsaturated rubbers and 15-85 wt. percent of chlorinated butyl rubber, interposed between the inner liner and carcass, have been tried without substantially increasing the adhesion of the liner to the carcass. It has also been proposed to unite a butyl rubber tread and a high unsaturated rubber carcass by a system of strips (tie gums) of rubbery material so formulated that the tie gum adjacent to the tread will adhere to the tread, the tie gum adjacent to the outer carcass will adhere to the carcass, and both strips forming the tie gum system will adhere to one another. However, difficulty has been experienced in obtaining satisfactory application of these tie gums to their respective components so as to protect the splice joints of these components from contact with the noncompatible rubber of the complementary component.

The present invention overcomes the foregoing difficulties; affords an improved method for curing halogenated, low unsaturated synthetic rubbery materials; and provides a means for improving the dynamic adhesion of said halogenated, low unsaturated rubbery materials to high unsaturated rubbery materials, such as natural rubber.

It has been proposed that dienophilic materials containing a quinone structure can be used as curing agents for halogenated, low unsaturated rubbery polymers. See copending application, U.S. Ser. No. 342,535. It has also been proposed that multimaleimides are useful curing agents for halogenated butyl rubber. See copending U.S. application, Ser. No. 406,156. Moreover, it is known that unhalogenated rubbery materials can be cured by mixing therewith small amounts of polyazo esters. See U.S. Patent 2,469,819. It is further known that unhalogenated butyl rubber can be chemically altered prior to vulcanization by mixing therewith minor amounts of azomonocarboxylate compounds. See U.S. Patent 2,994,357. However, some of the above-recited compounds have disadvantages from a commercial sense for the reasons that they are either commercially unavailable in sufficient quantities, too costly, and/or too toxic to handle.

According to the present invention, 100 parts of a halogenated, low unsaturated synthetic polymer are compounded with between about 1 and about 50 parts of a heavy metal oxide selected from the group consisting of zinc oxide, zinc peroxide and cuprous oxide, between about 0.1 and about 15 parts of an acyclic $\alpha,\beta$-unsaturated carbonyl dienophile, as hereinabove defined, and cured at a temperature of between about 250° F. and about 575° F. for between about 1 minute and about 200 minutes or more. In another feature of the present method, the halogenated, low unsaturated rubbery polymer is compounded with the heavy metal oxide and the acyclic $\alpha,\beta$-unsaturated carbonyl dienophile and applied to an uncured, conventionally compounded, e.g., sulphur, high unsaturated rubber surface. The resulting laminate can, thereafter, be compressed and cured at the foregoing temperatures and times to produce a high strength union, junction or weld. In still another feature of the present novel process, halogenated butyl rubber can be blended with between about 10 and about 80 wt. percent preferably between about 20 and about 40 wt. percent, of a high unsaturated rubber and cured with said cure system at the aforementioned temperature and times. However, it should be noted that the above-described cure system will not cure unhalogenated, low unsaturated rubbers.

The halogenated, low unsaturated synthetic polymers utilized in the present novel method are, in general, halogenated butyl rubber and halogenated ethylene-propylene-diene terpolymer rubbers. These synthetic rubbers, prior to halogenation, are characterized by a mole percent unsaturation of between about 0.5 and about 15, corresponding to an iodine number of between about 3 and about 90, and will range in viscosity average molecular weight between about 20,000 and about 1,500,000.

Butyl rubber comprises a copolymer of a major proportion, advantageously about 70–99.9 wt. percent of a $C_4$–$C_8$ isoolefin, preferably 85–99.5 wt. percent, of a $C_4$–$C_8$ isomonoolefin, such as isobutene and 2-methyl-1-butene and with a minor proportion, advantageously about 30–0.1 wt. percent, preferably 15–0.5 wt. percent, of a $C_4$–$C_{14}$ multiolefin, more preferably a $C_4$–$C_{10}$ diolefin, such as butadiene, dimethylbutadiene, piperylene, isoprene, alloocimene, myrcene and the like; conjugated diolefins such as isoprene are preferred. The preferred polymer is obtained by reacting between about 95 and about 99.5 wt. percent of isobutene, with between about 0.5 and about 5 wt. percent of isoprene. Cyclodiolefinic compounds such as cyclopentadiene, cyclohexadiene, and methylcyclopentadiene as well as compounds such as divinylbenzene, fulvene, and $\beta$-pinene may be incorporated with the isoolefin either in addition to the diolefin or in place of the diolefin. These additional compounds may be in corporated in amounts up to about 6 wt. percent, based on isoolefin, preferably in amounts of between about 0.3 wt. percent and about 2.0 wt. percent. The polymerization is generally carried out at a low temperature, e.g., between —50° C. and —165° C., in the presence of a Friedel-Crafts catalyst, such as aluminum trichloride, dissolved in a lower alkyl halide, such as methyl chloride, ethyl chloride, etc. The preparation of butyl-type rubbers is described in Chapter 24 of Synthetic Rubber by G. S. Whitby (editor-in-chief), John Wiley & Sons, 1954, as well as in U.S. Patent 2,356,128 to Thomas et al., inter alia.

In producing halogenated butyl rubber, unmodified, unvulcanized butyl rubber is carefully halogenated so as to preferably contain at least about 0.5 wt. percent, more preferably at least about 1.0 wt. percent combined halogen, but not more than about X wt. percent combined fluorine or chlorine, or 3 X wt. percent combined bromine or iodine, wherein:

$$X = \frac{M_3 L}{(100-1)M_1 + L(M_2+M_3)} \times 100$$

and:

L=mole percent of the multiolefin in the polymer
$M_1$=molecular weight of the isoolefin
$M_2$=molecular weight of the multiolefin
$M_3$=atomic weight of chlorine or bromine Restated, there should be at least about 0.5 wt. percent of combined halogen in the polymer but not more than about one atom of chlorine or three atoms, preferably two atoms, of bromine combined in the polymer per molecule of multiolefin present therein; i.e., per double bond in the polymer.

Suitable halogenating agents which may be employed are gaseous chlorine, liquid bromine, iodine monochloride, alkali metal hypochlorites or hypobromites such as sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromosuccinimide, alpha-chloroacetoacetanilide, tribromophenol bromide, N-chloracetamide, N-bromomethyl phthalimide, N,N'-dimethyl-5,5-dichloro or dibromohydantoin, and other common halogenating agents.

The halogenation is generally conducted at between about —50° C. and about +150° C., advantageously between about 0° C. and about 65° C., preferably between about 20° C. and about 50° C. (room temperature being satisfactory) depending upon the particular halogenating agent, for between about one minute and about several hours. An advantageous pressure range is between about 0.5 and about 400 p.s.i.a., atmospheric pressure being satisfactory. The halogenation conditions can be regulated to halogenate the rubbery copolymer to the extent above mentioned.

The halogenated copolymer formed advantageously has a viscosity average molecular weight (Mv) of between about 150,000 and about 1,500,000 and a mole percent unsaturation of between about 0.5 and about 15.0, preferably between about 0.6 and about 5.0. The preparation of halogenated butyl rubber is described more fully in U.S. Patent 2,944,578 to Baldwin et al. which is incorporated herein by reference.

Ethylene-propylene-diene terpolymers are generally prepared by contacting a feed stream containing ethylene, propylene and a polymerizable diolefin with a Ziegler polymerization catalyst in the presence of an inert saturated hydrocarbon diluent having 5 to 8 carbon atoms, i.e., an alkane or cycloalkane such as N-pentane, isopentane, N-hexane, isohexane or N-octane. The feed stream is allowed to remain in contact with the catalyst for a period of time which usually does not exceed five hours at a temperature in the range of between about —20° C. and about 150° C., preferably between about 0° C. and about 80 °C. As a matter of convenience, the copolymerization reaction is carried out at between about 1 and about 5 atmospheres pressure; however, pressures as high as 1,000 p.s.i. can be employed if desired.

The third polymerizable olefin which is employed is usually a non-conjugated diolefin having from 6 to 16 carbon atoms. Respective nonlimiting examples of this non-conjugated diolefin, which is either a linear or cyclic hydrocarbon, include 1,5-hexadiene and 1,5-octadiene; the 2-alkyl norbornadienes, such as 2-methyl-norbornadiene, 2-isopropyl-norbornadiene, 2-(3-methylbutyl)-norbornadiene, 2-neopentyl-norbornadiene, 2,n-dodecyl-norbornadiene; dicyclopentadiene; the 5-alkenyl-2-norbornenes such as 5-(1-propenyl)-2-norbornene and 5-methylene-2-norbornene; bicyclo - (2,2,1) - hepta - 2,5 - diene, unsaturated derivatives of bicyclo - (2,2,2) - octane, including bicyclo-(2,2,2)-octa-2,5-diene; unsaturated derivatives of bicyclo - (3,2,1) - octane; unsaturated derivatives of bicyclo - (3,3,1) - nonane; unsaturated derivatives of bicyclo - (3,2,2) - nonane; 4,7,8,9 - tetrahydroindene and its lower alkyl derivatives, and the like.

Halogenation of the ethylene-propylene-diene terpolymer is carried out in much the same manner as that used in halogenating butyl rubber. Conventionally, chlorine alone or with diluent, e.g., $N_2$, is passed into a benzene solution of between about 1 wt. percent and about 15 wt. percent, preferably about 6 wt. percent, of terpolymer at about 70° C. until the desired chlorine level of between about 1 wt. percent and about 10 wt. percent, preferably between about 3 wt. percent and about 6 wt. percent, is attained. The chlorinated terpolymer may be separated by alcohol precipitation or by steam distillation of the solvent.

By high unsaturated rubber is meant a rubber having an iodine number of between about 200 and about 700. Examples of rubbers falling within this category are natural rubber, polyisoprene, butadiene-styrene rubber (SBR), polybutadiene, and acrylonitrile-butadiene rubber (NBR). Preparation of the aforementioned synthetic rubbers is fully discussed in Chapters 7 and 23 of the aforementioned reference text, Synthetic Rubber by G. S. Whitby.

In addition to the conventional halogenated butyl rubbers, dehydrohalogenated butyl rubbers can also be utilized in the present novel process. Dehydrohalogenated butyl rubbers can be prepared by subjecting the halogenated material to heat and/or the action of basic materials which accept hydrogen halides, such as magnesium oxide or calcium oxide. Dehydrohalogenation can occur during vulcanization or in a separate hot mixing step which is generally performed at a temperature above 300° F. for a period of between about 1 minute and about 20 minutes.

The dienophiles which are utilized in the instant cure system can generally be described as acyclic, $\alpha,\beta$-unsaturated carbonyl dienophiles. Preferably, these acyclic dienophiles contain:

(a) A single carbonyl group in $\alpha,\beta$-relationship to a double or triple bond;

(b) A carbonyl group in $\alpha,\beta$-relationship to two unsaturated double or triple bonds; or (c) Two carbonyl group in $\alpha,\beta$-relationship to a single, double or triple bond.

The dienophiles utilized can be represented, in part, by the following structural formulae:

(a)
$$R-CH=CH-\overset{O}{\underset{\|}{C}}-CH=CH-R$$

wherein each R is selected from the group consisting of hydrogen, $C_1$–$C_{18}$ alkyl, and $C_6$–$C_{10}$ aryl;

(b)
$$R-C\equiv C-\overset{O}{\underset{\|}{C}}-C\equiv C-R$$

wherein each R is the same as in (a);

(c)

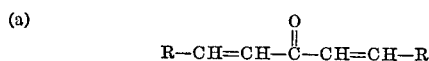

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R'' is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d)

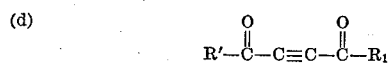

wherein R' and $R_1$ respectively are the same as in (c);

(e)

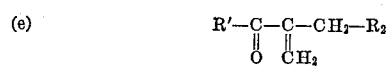

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$)alkoxy; and (f)

wherein R' and $R_1$ are the same as in (c).

Suitable examples of the various individual monovalent radicals represented by R—, R'—, $R_1$—, $R_2$— and —OM in the above structural formulae include the following:

(1) Examples of $C_1$–$C_{18}$, preferably $C_1$–$C_{12}$, alkyl groups include: methyl, ethyl, propyl, butyl, isobutyl, pentyl, hexyl, heptyl, octyl, nonyl, decyl, dodecyl, pentadecyl and octadecyl;

(2) Examples of $C_6$–$C_{10}$ aryl groups include: phenyl, tolyl, xylyl, trimethyl phenyl, ethyl phenyl, propyl phenyl, butyl phenyl, duryl, and naphthyl;

(3) Examples of $C_1$–$C_{18}$ alkoxy groups include: methoxy, ethoxy, propoxy, butoxy, pentoxy, hexoxy, heptoxy, octoxy, nonoxy, decoxy, dodecoxy and octadecoxy;

(4) Examples of carbo-($C_1$–$C_{18}$) alkoxy groups include: carbomethoxy, carboethoxy, carbopropoxy, carbobutoxy, carbopentoxy, carbohexoxy, carboheptoxy, carbooctoxy, carbononoxy, carbodecoxy, carbododecoxy, and carbooctadecoxy;

(5) Examples of univalent alkali metals which form the group —OM include: lithium, sodium, and potassium;

(6) Examples of $C_2$–$C_{10}$ alkenyl groups include: vinyl, 1-propenyl, allyl, 1-butenyl, 2-butenyl, 3-butenyl, 1-pentenyl, 2-pentenyl, 1-heptenyl, 3-heptenyl and 1-decenyl.

Representative examples of acyclic $\alpha,\beta$-unsaturated carbonyl dienophiles include: 1,5-diphenyl-1,4-pentadiene-3-one; 2,5-heptadiene-4-one; 3,6-nonadiene-5-one; 1,5-diphenyl-1,4-pentadiyne-3-one; dimethyl maleate; diethyl fumarate; di-n-butyl maleate; diallyl maleate; dimethyl citraconate; di-n-butyl fumarate; dibenzyl fumarate; 3-hexene-2,5-one; 3-methyl-3-hexene-2,5-one; trans-1,4-diphenyl-2-butene-1,4-one; 1 - methoxy - 2 - pentene-1,4-one; 1-methoxy - 2 - methyl-2-butene-1,4-one; dimethyl acetylene dicarboxylic acid; monopotassium acetylene dicarboxylic acid; dimethyl itaconate; diallyl itaconate; and potassium propiolate. Preferred $\alpha,\beta$-unsaturated carbonyl dienophiles are those compounds which are represented by the structural Formula c, which is depicted hereinabove. Especially preferred are the fumarates, such as diethyl fumarate.

In practicing the present novel process, the halogenated, low unsaturated synthetic rubbery polymer is compounded by mixing on a rubber mill, per 100 parts by weight of halogenated rubbery polymer, between about 0.1 and about 15 parts, preferably between about 1 and about 6 parts, of an acyclic $\alpha,\beta$-unsaturated carbonyl dienophile and between about 1 and about 50 parts preferably between about 2 and about 10 parts, of a heavy metal oxide, e.g., zinc oxide. In addition, between about 0 and about 100, preferably between about 20 and about 60 parts by weight, of a filler, such as clay, silica, silica-alumina, carbon blacks and carbon silica, as well as conventional accelerators, tackifiers, antioxidants, extender oils, pigments, etc., may be compounded with the synthetic polymer. Other conventional compounding and vulcanizing agents may be used for various special applications.

When utilizing the compounded low unsaturated polymers as a cement composition, the solvent employed can be any one or more of the following: the substituted and unsubstituted $C_6$–$C_{13}$ aliphatic and aromatic hydrocarbon solvents such as hexane, decane, benzene, carbon tetrachloride, carbon disulfide, cyclohexane, xylene, chlorobenzene, ethylene dichloride, nitrobenzene, etc.

The order of addition of the acyclic $\alpha,\beta$-unsaturated carbonyl dienophile and the heavy metal oxide to the low unsaturated, halogenated polymers is not critical when the addition is done at from about room temperature (78° F.) to about 150° F. However, when the melting point of the dienophile compound is above 150° F., or if the dienophile is difficult to disperse, it is preferable to add the dienophile without the heavy metal oxide and mix at temperatures up to about 300° F. and then allow the rubber stock to cool below 150° F. before adding the metal oxide.

The compounded, halogenated, low unsaturated rubbery polymer can be formed into any desired shape, which may include any of the usual methods for the processing of rubber or rubber substances including extruding and calendering. The compounded synthetic rubber can then be cured at temperatures ranging between about 250° F. and about 575° F., but preferably in the range of between about 285° F. and about 400° F., at a time interval, which ranges inversely with temperature, of between about 1 minute and about 200 minutes, but preferably between about 10 minutes and about 60 minutes.

The high unsaturated rubbery polymers utilized to prepare the laminates of the present process are compounded with conventional curing agents, curing aids and other ingredients in accordance with accepted procedures, i.e., using carbon blacks, accelerators, tackifiers, sulfur, antioxidants, extender oils, etc. In blending the halogenated, low unsaturated rubbers of the instant process with high unsaturated rubbery polymers, between about 20 and about 90 wt. percent, preferably between about 60 and about 80 wt. percent of the halogenated, low unsaturated rubber is blended with between about 80 and about 10 wt. percent, preferably betwen about 40 and about 20 wt. percent of the high unsaturated rubber. These blends can be prepared by simply admixing the respective rubbers on a mill or in a mixer followed by the addition of compounding ingredients.

In producing laminated rubber compositions from two dissimilar rubbers or blends of rubbers, the two dissimilar rubbery materials are separately compounded and then united and compressed at pressures of between about 50 p.s.i.g. and about 3,000 p.s.i.g., advantageously between about 500 p.s.i.g. and about 2,000 p.s.i.g., by any suitable means, such as in a rubber press, and simultaneously vulcanized at temperatures of between about 250° F. and about 575° F., preferably between about 285° F. and about 400° F., for a time interval, which ranges inversely with temperature, of between about 1 minute and about 200 minutes or more, e.g., between about 10 minutes and about 60 minutes.

The above procedure can be employed to produce superior laminated materials suitable for use in constructing tires for automobiles, trucks, tractors, airplanes, etc., such as for adhering a halogenated butyl rubber tread or sidewall or air-retaining inner liner to a tire carcass formed of SBR rubber, natural rubber, or mixtures thereof, as well as for numerous other uses such as for conveyor or drive belts and other products built up of a plurality of laminates of dissimilar rubbery materials. This procedure is especially applicable to such products which have at least one layer of halogenated rubber or blends thereof.

The acyclic $\alpha,\beta$-unsaturated carbonyl dienophile-metal oxide compounded halogenated, low unsaturated rubbers of the present process can also be adhered to siliceous surfaces, e.g., glass fibers or silica filler surfaces. Briefly, the glass fiber or silica filler surface is treated with a substituted alkyl or vinyl silane, which in the case of halogenated butyl rubber can be gamma aminopropyl triethoxysilane, beta mercapto - ethyl trimethoxysilane, gamma methacryloxypropyl trimethoxysilane, gamma glycidoxypropyl trimethoxysilane, or vinyl silane. In the case of ethylene-propylene-diene terpolymers, the siliceous surface can be reated with a substituted alkyl or vinyl silane, e.g., gamma aminopropyl triethoxysilane, beta mercaptoethyl trimethoxysilane, gamma methacryloxypropyl trimethoxysilane, gamma glycidoxypropyl trimethoxysilane or vinyl silane.

The treated glass fiber or silica surface is then coated with a layer of the dienophile-metal oxide compounded halogenated, low unsaturated rubber. The rubbery polymer and silane finished glass are then contiguously placed in conventional vulcanizing equipment, e.g., a flat cavity mold, and heated at a temperature of between about 250° F. and about 400° F., preferably between about 300° F. and about 330° F., for a time period of between about 3 and about 120 minutes, preferably between about 10 and about 60 minutes, and cured under pressures of between about 5 and between about 1,000 p.s.i.g., preferably between about 50 and 600 p.s.i.g.

The preparation, properties, compounding, vulcanization and use of the compositions of the present process are more fully set forth in the following examples which are intended as illustrative only since numerous modifications and variations therein will be apparent to those skilled in the art. For the sake of brevity, the adhesion aspects of the present novel cure system will, for the most part, be illustrated with natural rubber and 50/50 blends of natural rubber and SBR rubber. However, unless otherwise stated, any of the other high unsaturated sulfur-vulcanizable rubbers mentioned hereinabove can be used to prepare the laminated compositions described herein.

The following test methods were employed to evaluate the properties of the formulated compounds presented in the ensuing examples. Tensile, elongation and modulus were evaluated according to ASTM method D412–51T. A Shore A Durometer, ASTM 676–58T, was used to determine the hardness of the vulcanizate. Ozone resistance was ascertained by clamping tensile specimens (ASTM Die C) at 50% extension in a bell jar containing 0.2 volume percent ozone at room temperature. The adhesion of low unsaturated synthetic rubbers to high unsaturated rubbers was evaluated by preparing a spirally laminated pellet of the two dissimilar rubbers (about 1 inch high and about ¾ inch in diameter), curing the pellet, and thereafter subjecting it to dynamic stress by means of a Goodrich Flexometer (ASTM D623–52T, Method A, at 212° F., stroke—0.25 inch, frequency—30 cycles/second, test duration—30 minutes). This test will hereafter be referred to as the Spiral Dynamic Adhesion (SDA) test. Mooney Scorch was ascertained according to ASTM D1646–59T run at 270° F. using the small (MS) rotor. Test specimens were warmed up one minute.

EXAMPLE 1

Chlorobutyl HT 10–66, a commercial grade of chlorinated butyl rubber having a viscosity average molecular weight of between about 350,000 and about 400,000, a mole percent unsaturation of between about 1% and about 2%, a chlorine content of between about 1.1 wt. percent and about 1.3 wt. percent and a Mooney viscosity (ML 8 minutes at 212° F.) of between about 50 and about 60, was compounded, as shown in Table I, on a cool two-roll mill. Portions of the formulations shown in Table I were press-cured at 307° F. for 30 minutes and their vulcanizate properties evaluated. The results of these evaluations are also tabulated in Table I below each of the corresponding formulations.

TABLE I

| Compound (parts by wt.) | 1 | 2 | 3 | 4 |
|---|---|---|---|---|
| Chlorobutyl HT 10-66 | 100 | 100 | 100 | 100 |
| SRF [1] carbon black | 50 | 50 | 50 | 50 |
| Flexon 845 [2] | 5 | 5 | 5 | 5 |
| Zinc oxide | 5 | 5 | 5 | 5 |
| Acetylene dicarboxylic acid-mono potassium salt | | 2 | | |
| Diethyl fumarate | | | 2 | |
| Trans-1,4-diphenyl-2-butene-1,4-dione | | | | 2 |

Vulcanizate Properties (30 min. Cure at 307° F.)

| | | | | |
|---|---|---|---|---|
| Modulus (300%), p.s.i. | 730 | 800 | 520 | 370 |
| Tensile, p.s.i. | 1,675 | 1,410 | 1,480 | 1,140 |
| Elongation, percent | 545 | 470 | 695 | 725 |
| Hardness, Shore A | 47 | 46 | 45 | 45 |
| Ozone resistance minutes to crack | 5 | 9 | 280 | 72 |
| Mooney scorch minutes for 10-point rise | 29.6 | 22.2 | >30 | >30 |

[1] Semi-reinforcing furnace black.
[2] A paraffinic oil extender having a specific gravity of 0.865 and an aniline point of 216° F.

The data in Table I show that processible compounds of chlorobutyl rubber, which have acceptable vulcanizate properties, are obtained with acyclic α,β-unsaturated carbonyl dienophiles. The ozone resistance of their vulcanizates is also markedly improved, with outstanding ozone resistance being afforded by diethyl fumarate.

EXAMPLE 2

Samples of each of the compounded unvulcanized chlorobutyl rubbers shown in Table I of Example 1 were formed into spirally laminated pellets with a 50/50 natural rubber/SBR rubber blend which had been compounded in accordance with the recipe of Table II. The pellets were cured at 307° F. for 45 minutes and tested for dynamic adhesion on a Goodrich flexometer (SDA) test. The results of these tests are found in Table III.

TABLE II.—50/50 NATURAL RUBBER/SBR RUBBER MASTERBATCH

| Compound: | Parts by weight |
|---|---|
| Natural rubber | 50 |
| SBR–1500 rubber [1] | 50 |
| FEF black [2] | 30 |
| EPC black [3] | 10 |
| Flexon 380 [4] | 5 |
| Stearic acid | 1 |
| Zinc oxide | 3 |
| Age Rite Stalite [5] | 1 |
| Sulfur | 2.5 |
| NOBS Special [6] | 1.25 |
| Altax | 0.25 |

[1] Commercial butadiene-styrene rubber having the ASTM number 1500 and a Mooney viscosity (ML 4 min. at 212° F.) of between 46 and 58.
[2] Fast extruding furnace black.
[3] Easy processing channel black.
[4] A refined aromatic oil of about 95 sec. viscosity (SSU) at 210° F., an aniline point of 139° F., and a specific gravity of 0.9580 at 60° F.
[5] A mixture of octylated diphenylamines used as an antioxidant.
[6] N-oxydiethylene benzothiazole-2-sulfenamide.

TABLE III.—DYNAMIC ADHESION [1] TO 50/50 NATURAL RUBBER/SBR CARCASS COMPOUND (SDA TEST)

| Compound | 1 | 2 | 3 | 4 |
|---|---|---|---|---|
| Flexometer load, lbs | 9 | 10 | 10 | 10 |
| Percent initial dynamic compression | −1.3 | 2.2 | 0.2 | 1.4 |
| Percent dynamic drift | 1.2 | 4.3 | 3.3 | 3.8 |
| Δ T., ° C | 17 | 24 | 22 | 25 |
| Appearance inside pellet | ([2]) | Solid | Solid | Solid |

[1] Dynamic adhesion evaluated with spirally laminated pellets cured 45 minutes at 307° F. and tested on a Goodrich Flexometer for 30 minutes at 212° F., with ¼ inch stroke and 30 cycles per second.
[2] Delaminated.

The data in Table III show that acyclic α,β-unsaturated carbonyl dienophiles promote the dynamic adhesion of halogenated butyl rubbers to blends of high unsaturated rubbers.

In order to further illustrate the dynamic adhesion of acyclic α,β-unsaturated carbonyl dienophile-cured halogenated butyl rubbers to rubbers of high unsaturation, portions of the compounded chlorobutyl formulations of Table I in Example 1 were formed into spirially laminated pellets with a compounded natural rubber. The natural rubber was compounded in accordance with the recipe found in Table IV. The laminated pellets were cured at 307° F. for 45 minutes and subjected to the SDA test. The results of that test appear in Table V.

TABLE IV.—NATURAL RUBBER MASTERBATCH

| Compound: | Parts by weight |
|---|---|
| Natural rubber | 100 |
| SRF black | 50 |
| Age Rite Stalite | 1 |
| Stearic acid | 2 |
| Zinc oxide | 5 |
| Sulfur | 2.5 |
| Altax | 1 |
| Methyl tuads [1] | 0.3 |

[1] Tetramethyl thiuram disulfide.

TABLE V.—DYNAMIC ADHESION [1] TO NATURAL RUBBER COMPOUND

| Compound | 1 | 2 | 3 | 4 |
|---|---|---|---|---|
| Flexometer load, lbs | 8 | 10 | 10 | 15 |
| Percent initial dynamic compression | −4.6 | 1.8 | 2.3 | 1.7 |
| Percent dynamic drift | 0.0 | 0.1 | 0.6 | 0.7 |
| Δ T., ° C | 16 | 22 | 15 | 26 |
| Appearance inside pellet | ([2]) | Solid | Solid | Solid |

[1] Dynamic adhesion evaluated with spirally laminated pellets cured 45 minutes at 307° F. and tested on a Goodrich Flexometer for 30 minutes at 212° F., with ¼ inch stroke and 30 cycles per second.
[2] Delaminated slightly.

The data in Table V show that the dienophiles of the present method promote the adhesion of halogenated butyl rubber to rubbers of high unsaturation and especially to natural rubber.

EXAMPLE 3

In order to demonstrate the uniqueness of the instantly disclosed acyclic α,β-unsaturated carbonyl dienophiles, chlorobutyl HT 10–66 was compounds with other dienophilic materials in accordance with the formulations tabulated in Table VI. Compound 2 from Example 1 in Table I is included therein for comparison purposes. Each of the formulations was tested for Mooney Scorch and the amount of time required for a 10-point rise is indicated in Table VI.

TABLE VI

| Compound (parts by weight) | 5 | 6 | 2 | 7 | 8 | 9 |
|---|---|---|---|---|---|---|
| Chlorobutyl HT 10-66 | 100 | 100 | 100 | 100 | 100 | 100 |
| SRF black | 50 | 50 | 50 | 50 | 50 | 50 |
| Flexon 845 | 5 | 5 | 5 | 5 | 5 | 5 |
| Zinc oxide | 5 | 5 | 5 | 5 | 5 | 5 |
| Acetylene dicarboxylic acid | 2 | | | | | |
| Dimethyl acetylene dicarboxylate | | 2 | | | | |
| Acetylene dicarboxylic acid mono potassium salt | | | 2 | | | |
| Itaconic anhydride | | | | 2 | | |
| Citraconic anhydride | | | | | 2 | |
| Maleic anhydride | | | | | | 2 |
| Mooney scorch minutes for 10-point rise | 8.8 | 20.1 | 22.2 | 7.6 | 5.9 | 6.0 |

The data in Table VI show that the acyclic α,β-unsaturated carbonyl dienophiles of the instant novel method are restricted to a maximum of one carboxylic group for the reason that when two carboxylic groups are present, such as in acetylene dicarboxylic acid (Compound 5), the rubber formulation is subject to scorch which precludes easy processibility. In contrast, when none or one carboxylic group is present, i.e., Compounds 6 and 2, the rubber formulations are not subject to quick scorch as illustrated by the higher Mooney Scorch value. Compounds 7 through 9 demonstrate that cyclic dienophiles, i.e., anhydrides of unsaturated dicarboxylic acids, are unsuitable as curing agents for halogenated butyl rubber for the reason that these compounds also make the compounded rubber formulations subject to scorch as shown by the low value of Mooney Scorch in Table VI.

EXAMPLE 4

In accordance with the procedure of Example I, other acyclic α,β-unsaturated carbonyl dienophiles, Compounds 10 through 14, were formulated in accordance with the recipe of Table VII. Portions of these compounds were cured at 307°F. for 30 minutes while other portions were formed into spirally laminated pellets with a 50/50 natural rubber/SBR rubber blend which had been compounded according to the recipe of Table II. These pellets were then evaluated for dynamic adhesion by the SDA test. Inspections of the physical properties of the cured vulcanizates as well as the results of the SDA test are found in Table VIII.

TABLE VII

| Compound (parts by weight) | 10 | 11 | 12 | 13 | 14 |
|---|---|---|---|---|---|
| Chlorobutyl HT 10-66 | 100 | 100 | 100 | 100 | 100 |
| SRF black | 50 | 50 | 50 | 50 | 50 |
| Flexon 845 | 5 | 5 | 5 | 5 | 5 |
| Zinc oxide | 5 | 5 | 5 | 5 | 5 |
| Dimethyl itaconate | 2 | | | | |
| Di-n-butyl maleate | | 2 | | | |
| Diallyl maleate | | | 2 | | |
| 1,5-diphenyl-3-pentadienone | | | | 2 | |
| Dimethyl acetylene dicarboxylate | | | | | 2 |

TABLE VIII.—VULCANIZATE PROPERTIES (30 MIN. CURE AT 307° F.)

| Compound | 10 | 11 | 12 | 13 | 14 |
|---|---|---|---|---|---|
| Modulus (300%), p.s.i | 480 | 360 | 490 | 370 | 400 |
| Tensile, p.s.i | 1,450 | 1,190 | 1,115 | 1,180 | 1,580 |
| Elongation, percent | 600 | 665 | 575 | 710 | 695 |
| Hardness, Shore A | 44 | 44 | 45 | 45 | 45 |
| Ozone resistance minutes to crack | 11 | 14 | 10 | 7 | 18 |
| Mooney Scorch minutes for 10-point rise | >30 | >30 | >30 | >30 | 20.1 |
| Dynamic Adhesion to 50/50 Natural Rubber/SBR Rubber Blend | | | | | |
| Flexometer load, lbs | 10 | 10 | 10 | 10 | 10 |
| Percent initial dynamic compression | 3.3 | 1.2 | −0.3 | 2.0 | 0.6 |
| Percent dynamic drift | 3.2 | 3.1 | 2.6 | 5.5 | 2.2 |
| Δ T,, ° C | 24 | 25 | 20 | 26 | 21 |
| Appearance inside pellet | Solid | Solid | Solid | Solid | Solid |

The data in Table VIII demonstrates that the acyclic dienophiles of the present novel method improve the dynamic adhesion of halogenated butyl rubber to high unsaturated rubbers and yield halogenated rubber vulcanizates of excellent scorch resistance and acceptable physical properties as illustrated by modulus, tensile, elongation and Shore A hardness.

EXAMPLE 5

The procedure of Example 1 was repeated except that amount of dienophile was varied so as to produce polymer compositions containing 0.1, 0.5, and 10.0 parts of dienophile (diethyl fumarate) per 100 parts of chlorobutyl rubber. Similar results were obtained in that the vulcanizates were scorch resistant and pellets prepared by adhesion to a 50/50 natural rubber/SBR rubber blend remaining solid when subjected to the SDA test. Compounding data and physical properties have been tabulated in Table IX.

TABLE IX

| Compound | 1 | 2 | 3 | 4 |
|---|---|---|---|---|
| Chlorobutyl HT 10-66 | 100 | 100 | 100 | 100 |
| SRF carbon black | 50 | 50 | 50 | 50 |
| Flexon 845 | 5 | 5 | 5 | 5 |
| Zinc oxide | 5 | 5 | 5 | 5 |
| Diethyl fumarate | | 0.1 | 0.5 | 1.0 |
| Vulcanizate Properties (30 min. Cure at 307° F.) | | | | |
| Modulus (300%), p.s.i | 730 | 775 | 650 | 250 |
| Tensile, p.s.i | 1,675 | 1,770 | 1,780 | 1,200 |
| Elongation, percent | 545 | 540 | 640 | 865 |
| Hardness, Shore A | 47 | 47 | 47 | 42 |
| Mooney scorch minutes for 10-point rise | 29.6 | >30 | >30 | >30 |
| Dynamic Adhesion to 50/50 Natural Rubber/SBR Carcass Compound (SDA Test) | | | | |
| Flexometer load, lbs | 9 | 15 | 12 | 11 |
| Percent initial dynamic compression | −1.3 | 6.9 | 3.4 | 3.2 |
| Percent dynamic drift | 1.2 | 13.3 | 4.9 | 3.7 |
| ΔT., ° C | 17 | 27.5 | 29 | 27 |
| Appearance inside pellet | (¹) | Solid | Solid | Solid |

¹ Delaminated.

EXAMPLE 6

The procedure of Example 1 is repeated except that the following dienophiles, in an amount of 2 parts per 100 parts of Bromobutyl MD–571, are utilized. Bromobutyl MD–571 rubber has a viscosity average molecular weight of between about 400,000 and about 500,000, a mole percent unsaturation of between about 1.7% and about 2.0%, a bromine content of between about 2 wt. percent and between about 3.5 wt. percent and a Mooney viscosity (ML 8 minutes at 212°F.) of between 60 and about 70. The acyclic dienophiles utilized are: diethyl fumarate, methyl β-acetylacrylate, 2,5-heptadiene-4-one, 2,5-dioxo-3-hexene, 1 methoxy-1,2-dioxo-3-pentene, and 4,5-dioxo-2-hexene.

Each of the above acyclic dienophiles exert improved dynamic adhesion between a compounded, brominated butyl rubber and a compounded 50/50 natural rubber/SBR rubber blend.

EXAMPLE 7

Example 1 is repeated except that 5 parts of zinc peroxide and 5 parts of cuprous oxide are separately substituted for the 5 parts of zinc oxide in Table I. Both zinc peroxide and cuprous oxide are effective in obtaining a successful cure of the compounded halogenated butyl rubber.

EXAMPLE 8

A terpolymer consisting of 65 mole percent ethylene, 32 mole percent propylene and 3% methylene norbornene is chlorinated at 69° C. The resulting product has an inherent viscosity of 2.46, an iodine number of 4.1, and contains 4.6 wt. percent chlorine. The chlorinated terpolymer is compounded, per 100 parts of terpolymer, with 50 parts SRF carbon black, 5 parts Flexon 845, 5 parts zinc oxide and 5 parts of Amberol ST 137X (a thermosetting resin of 4-octyl phenyl-formaldehyde condensate used as a tackifier). Portions of the aforementioned chlorinated EPT terpolymer masterbatch are further compounded with two parts, per 100 parts of EPT, of each of the acyclic $\alpha,\beta$-unsaturated carbonyl dienophiles utilized in Example 1, Table I, and cured for 30 minutes at 307° F.

Inspections of the resulting vulcanizate properties show that these dienophiles are effective in improving the vulcanizate properties of a chlorinated ethylene-propylene-diene terpolymer.

EXAMPLE 9

Enjay Butyl 218, a commercial grade of unhalogenated butyl rubber having a viscosity average molecular weight of between about 400,000 and about 600,000, a mole percent unsaturation of between about 1.5 and about 2.0, and a Mooney viscosity (ML 3 minutes at 260° F.) of between about 50 and about 60, was compounded, as shown in Table X, on a cool two-roll mill. Portions of the formulations thus prepared were press-cured for 30 minutes at 307° F., but failed to cure.

TABLE X

| Compound: | Parts by weight |
|---|---|
| Enjay Butyl 218 | 100 |
| SRF black | 50 |
| Flexon 845 | 5 |
| Zinc oxide | 10 |
| Diethyl fumarate | 2 |

While there are above-described a number of specific embodiments of the present invention, it is obviously possible to produce other embodiments and various equivalent modifications and variations thereof without departing from the spirit of the invention.

Having set forth the general nature and specific embodiments of the present invention, the true scope is now particularly pointed out in the appended claims.

What is claimed is:

1. A rubbery vulcanizable composition of matter comprising, per 100 parts of a halogenated, low unsaturated synthetic rubber, wherein the halogenated, low unsaturated synthetic rubber is selected from the group consisting of (1) halogenated copolymers of a major amount of a $C_4$–$C_8$ isoolefin and a minor amount of a $C_4$–$C_{14}$ multiolefin, and (2) halogenated ethylene-propylene-diene terpolymers, between about 1 and about 50 parts of a metal oxide selected from the group consisting of zinc oxide, zinc peroxide and cuprous oxide, and between about 0.1 and about 15 parts of an acylic $\alpha,\beta$-unsaturated carbonyl dienophile, wherein the acyclic $\alpha,\beta$-unsaturated carbonyl dienophile is represented by the following structural formulae:

(a)
$$R-CH=CH-\overset{O}{\underset{\|}{C}}-CH=CH-R$$

wherein each R is selected from the group consisting of hydrogen, $C_1$–$C_{18}$ alkyl, and $C_6$–$C_{10}$ aryl;

(b)
$$R-C\equiv C-\overset{O}{\underset{\|}{C}}-C\equiv C-R$$

wherein each R is the same as in (a);

(c)
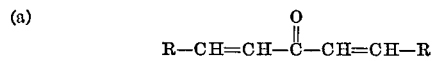

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d)
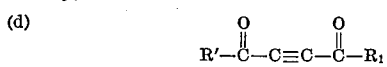

wherein R' and $R_1$ are the same as in (c);

(e)
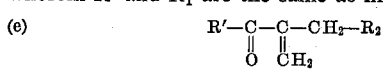

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$)alkoxy; and (f)

wherein R' and $R_1$ are the same as in (c).

2. The rubbery composition of claim 1 wherein the dienophile is diethyl fumarate.

3. The rubbery composition of claim 1 wherein the halogenated isoolefin-multiolefin copolymer is selected from the group consisting of chlorinated and brominated copolymers of between about 70 and about 99.9 wt. percent of a $C_4$–$C_8$ isoolefin and between about 30 and about 0.1 wt. percent of a $C_4$–$C_{14}$ multiolefin, and wherein said halogenated copolymer contains at least 0.5 wt. percent of combined halogen and wherein the amount of halogen and the halogen are correlated and selected from the group consisting of not more than about 1 atom of combined chlorine per double bond in the copolymer and not more than about 3 atoms of combined bromine per double bond in the copolymer.

4. The rubbery composition of claim 1 wherein the halogenated terpolymer is an ethylene-propylene-methylene norbornene terpolymer.

5. The rubbery composition of claim 1 wherein the isoolefin is isobutene and the multiolefin is isoprene.

6. A rubbery vulcanizable composition of matter comprising, per 100 parts of a halogenated copolymer of between about 85 and about 99.5 wt. percent of a $C_4$–$C_8$ isomonolefin and between about 15 and about 0.5 wt. percent of a $C_4$–$C_{10}$ diolefin, between about 1 and about 50 parts of a metal oxide selected from the group consisting of zinc oxide, zinc peroxide, and cuprous oxide, and between about 0.1 and about 15 parts of an acyclic $\alpha,\beta$-unsaturated carbonyl dienophile, wherein the acyclic $\alpha,\beta$-unsaturated carbonyl dienophile is represented by the following structural formulae:

(a)
$$R-CH=CH-\overset{O}{\underset{\|}{C}}-CH=CH-R$$

wherein each R is selected from the group consisting of hydrogen, $C_1$–$C_{18}$ alkyl, and $C_6$–$C_{10}$ aryl;

(b)
$$R-C\equiv C-\overset{O}{\underset{\|}{C}}-C\equiv C-R$$

wherein each R is the same as in (a);

(c)
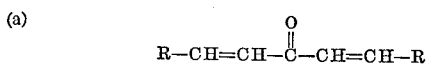

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d)
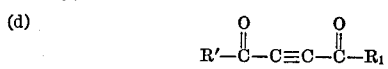

wherein R' and $R_1$ are the same as in (c);

(e) 

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$) alkoxy; and (f) 

wherein R' and $R_1$ are the same as in (c).

7. A cured rubbery composition of matter comprising, per 100 parts of a halogenated, low unsaturated synthetic rubber, wherein the halogenated, low unsaturated synthetic rubber is selected from the group consisting of (1) halogenated copolymers of a major amount of a $C_4$–$C_8$ isoolefin and a minor amount of a $C_4$–$C_{14}$ multiolefin, and (2) halogenated ethylene-propylene-diene terpolymers, between about 1 and about 50 parts of a metal oxide selected from the group consisting of zinc oxide, zinc peroxide and cuprous oxide, and between about 0.1 and about 15 parts of an acyclic $\alpha,\beta$-unsaturated carbonyl dienophile, wherein the acyclic $\alpha,\beta$-unsaturated carbonyl dienophile is represented by the following structural formulae:

(a)

$$R-CH=CH-\overset{O}{\overset{\|}{C}}-CH=CH-R$$

wherein each R is selected from the group consisting of hydrogen, $C_1$–$C_{18}$ alkyl, and $C_6$–$C_{10}$ aryl;

(b)

$$R-C\equiv C-\overset{O}{\overset{\|}{C}}-C\equiv C-R$$

wherein each R is the same as in (a);

(c) 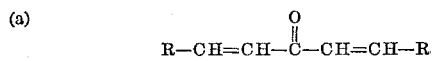

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkalin metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d) 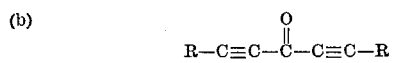

wherein R' and $R_1$ are the same as in (c);

(e) 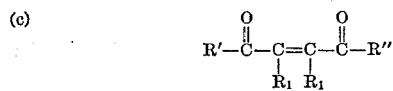

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$) alkoxy; and (f) 

wherein R' and $R_1$ are the same as in (c), said rubbery composition having been cured at a temperature of between about 250° F. and about 575° F. for between about 1 minute and about 200 minutes.

8. The cured rubbery composition of claim 7 wherein the dienophile is diethyl fumarate.

9. The cured rubbery composition of claim 7 wherein the halogenated isoolefin-multiolefin copolymer is selected from the group consisting of chlorinated and brominated copolymers of between about 70 and about 99.9 wt. percent of a $C_4$–$C_8$ isoolefin and between about 30 and about 0.1 wt. percent of a $C_4$–$C_{14}$ multiolefin, and wherein said halogenated copolymer contains at least 0.5 wt. percent of combined halogen and wherein the amount of halogen and the halogen are correlated and selected from the group consisting of not more than about 1 atom of combined chlorine per double bond in the copolymer and not more than about 3 atoms of combined bromine per double bond in the copolymer.

10. The cured rubbery composition of claim 7 wherein the halogenated terpolymer is an ethylene-propylene-methylene norbornene terpolymer.

11. The cured rubbery composition of claim 7 wherein the isoolefin is isobutene and the multiolefin is isoprene.

12. A cured rubbery composition of matter comprising, per 100 parts of a halogenated copolymer of between about 85 and about 99.5 wt. percent of a $C_4$–$C_8$ isomonoolefin and between about 15 and about 0.5 wt. percent of a $C_4$–$C_{10}$ diolefin, between about 1 and about 50 parts of a metal oxide selected from the group consisting of zinc oxide, zinc peroxide, and cuprous oxide, and between about 0.1 and about 15 parts of an acyclic $\alpha,\beta$-unsaturated carbonyl dienophile, wherein the acyclic $\alpha,\beta$-unsaturated carbonyl dienophile is represented by the following structural formulae:

(a)

$$R-CH=CH-\overset{O}{\overset{\|}{C}}-CH=CH-R$$

wherein each R is selected from the group consisting of hydrogen, $C_1$–$C_{18}$ alkyl, and $C_6$–$C_{10}$ aryl;

(b)

$$R-C\equiv C-\overset{O}{\overset{\|}{C}}-C\equiv C-R$$

wherein each R is the same as in (a);

(c) 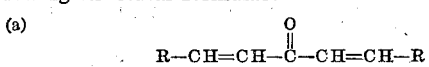

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d) 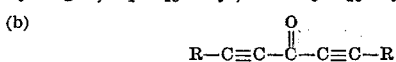

wherein R' and $R_1$ are the same as in (c);

(e) 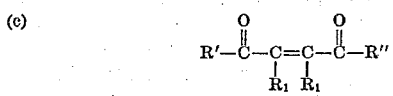

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$)alkoxy; and (f) 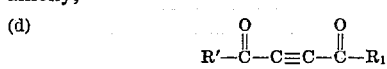

wherein R' and $R_1$ are the same as in (c), said rubbery composition having been cured at a temperature of between 250° F. and about 575° F. for between about 1 minute and about 200 minutes.

13. A process for preparing a cured rubbery composition which comprises admixing, per 100 parts of a halogenated, low unsaturated synthetic rubber, wherein the halogenated, low unsaturated synthetic rubber is selected from the group consisting of (1) halogenated copolymers of a major amount of a $C_4$–$C_8$ isoolefin and a minor amount of a $C_4$–$C_{14}$ multiolefin, and (2) halogenated ethylene-propylene-diene terpolymers, between about 1 and about 50 parts of a metal oxide selected from the group consisting of zinc oxide, zinc peroxide and cuprous oxide, and between about 0.1 and about 15 parts of an acyclic $\alpha,\beta$-unsaturated carbonyl dienophile, wherein the acyclic $\alpha,\beta$-unsaturated carbonyl dienophile is represented by the following structural formulae:

(a)

$$R-CH=CH-\overset{O}{\overset{\|}{C}}-CH=CH-R$$

wherein each R is selected from the group consisting of hydrogen, $C_1$–$C_{18}$ alkyl, and $C_6$–$C_{10}$ aryl;

(b)

$$R-C\equiv C-\overset{O}{\overset{\|}{C}}-C\equiv C-R$$

wherein each R is the same as in (a);

(c)
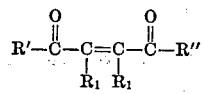

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d)
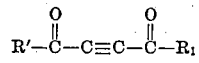

wherein R' and $R_1$ are the same as in (c);

(e)
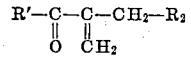

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$) alkoxy; and (f)
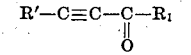

wherein R' and $R_1$ are the same as in (c); and curing the resultant admixture at a temperature of between about 250° F. and about 575° F. for between about 1 minute and about 200 minutes.

14. The process of claim 13 wherein the dienophile is diethyl fumarate.

15. The process of claim 13 wherein the halogenated isoolefin-multiolefin copolymer is selected from the group consisting of chlorinated and brominated copolymers of between about 70 and about 99.9 wt. percent of a $C_4$–$C_8$ isoolefin and between about 30 and about 0.1 wt. percent of a $C_4$–$C_{14}$ multiolefin, and wherein said halogenated copolymer contains at least 0.5 wt. percent of combined halogen and wherein the amount of halogen and the halogen are correlated and selected from the group consisting of not more than about 1 atom of combined chlorine per double bond in the copolymer and not more than about 3 atoms of combined bromine per double bond in the copolymer.

16. The process of claim 13 wherein the halogenated terpolymer is an ethylene-propylene-methylene norbornene terpolymer.

17. The process of claim 13 wherein the isoolefin is isobutene and the multiolefin is isoprene.

18. A process for preparing a cured rubbery composition which comprises admixing, per 100 parts of a halogenated copolymer of between about 85 and about 99.5 wt. percent of a $C_4$–$C_8$ isomonoolefin and between about 15 and about 0.5 wt. percent of a $C_4$–$C_{10}$ diolefin, between about 1 and about 50 parts of a metal oxide selected from the group consisting of zinc oxide, zinc peroxide, and cuprous oxide, and between about 0.1 and about 15 parts of an acyclic α,β-unsaturated carbonyl dienophile, wherein the acyclic α,β-unsaturated carbonyl dienophile is represented by the following structural formulae:

(a)
$$R-CH=CH-\overset{O}{\overset{\|}{C}}-CH=CH-R$$

wherein each R is selected from the group consisting of hydrogen, $C_1$–$C_{18}$ alkyl, and $C_6$–$C_{10}$ aryl;

(b)
$$R-C\equiv C-\overset{O}{\overset{\|}{C}}-C\equiv C-R$$

wherein each R is the same as in (a);

(c)
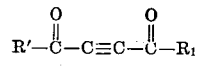

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d)
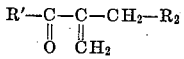

wherein R' and $R_1$ are the same as in (c);

(e)
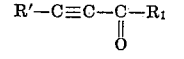

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$) alkoxy; and (f)
$$R'-C\equiv C-\overset{O}{\overset{\|}{C}}-R_1$$

wherein R' and $R_1$ are the same as in (c); and curing the resultant admixture at a temperature of between about 250° F. and about 575° F. for between about 1 minute and about 200 minutes.

19. A cured rubbery composition comprising a vulcanized halogenated, low unsaturated synthetic rubber, wherein the halogenated, low unsaturated synthetic rubber is selected from the group consisting of (1) halogenated copolymers of a major amount of a $C_4$–$C_8$ isoolefin and a minor amount of a $C_4$–$C_{14}$ multiolefin, and (2) halogenated ethylene-propylene-diene terpolymers, adjacent to and in contact with a compounded but unvulcanized high unsaturated rubber, said halogenated, low unsaturated rubber having been compounded with between about 1 and about 50 parts, per 100 parts of rubber, of a metal oxide selected from the group consisting of zinc oxide, zinc peroxide and cuprous oxide, and between about 0.1 and about 15 parts, per 100 parts of rubber, of an acyclic α,β-unsaturated carbonyl dienophile, wherein the acyclic α,β-unsaturated carbonyl dienophile is represented by the following structural formulae:

(a)
$$R-CH=CH-\overset{O}{\overset{\|}{C}}-CH=CH-R$$

wherein each R is selected from the group consisting of hydrogen, $C_1$–$C_{18}$ alkyl, and $C_6$–$C_{10}$ aryl;

(b)
$$R-C\equiv C-\overset{O}{\overset{\|}{C}}-C\equiv C-R$$

wherein each R is the same as in (a);

(c)
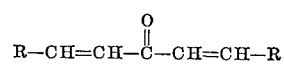

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d)
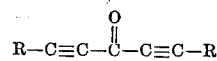

wherein R' and $R_1$ are the same as in (c);

(e)
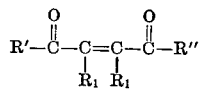

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$)alkoxy; and (f)
$$R'-C\equiv C-\overset{O}{\overset{\|}{C}}-R_1$$

wherein R' and $R_1$ are the same as in (c); said adjacent rubbers having been cured while in contact with one another at a temperature of between about 250° F. and about 575° F. for between about 1 minute and about 200 minutes.

20. The rubbery composition of claim 19 wherein the acyclic α,β-unsaturated carbonyl dienophile is represented by the following structural formula:

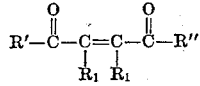

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy.

21. The rubbery composition of claim 19 wherein the dienophile is diethyl fumarate.

22. The rubbery composition of claim 19 wherein the high unsaturated rubber is selected from the group consisting of natural rubber, polyisoprene, polybutadiene, butadiene-styrene rubber, acrylonitrile-butadiene rubber and blends thereof.

23. A cured rubbery composition comprising, (1) a vulcanizable blend of (a) between about 20 and about 90 wt. percent of a halogenated, low unsaturated synthetic rubber, wherein the halogenated, low unsaturated synthetic rubber is selected from the group consisting of (1) halogenated copolymers of a major amount of a $C_4$–$C_8$ isoolefin and a minor amount of a $C_4$–$C_{14}$ multiolefin, and (2) halogenated ethylene-propylene-diene terpolymers, and (b) between about 80 and about 10 wt. percent of a high unsaturated rubber, said vulcanizable blend (1) having been compounded with between about 1 and about 50 parts, per 100 parts of blend, of a metal oxide selected from the group consisting of zinc oxide, zinc peroxide and cuprous oxide, and between about 0.1 and about 15 parts, per 100 parts of blend, of an acyclic α,β-unsaturated carbonyl dienophile, wherein the acyclic α,β-unsaturated carbonyl dienophile is represented by the following structural formulae:

(a)
$$R-CH=CH-\overset{O}{\overset{\|}{C}}-CH=CH-R$$

wherein each R is selected from the group consisting of hydrogen, $C_1$–$C_{18}$ alkyl, and $C_6$–$C_{10}$ aryl;

(b) 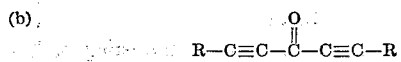

wherein each R is the same as in (a);

(c) 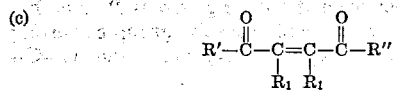

wherein R' is selected from the group consisting of hydrogen, $C_1$–$C_{18}$ alkoxy, $C_2$–$C_{10}$ alkenyl, $C_1$–$C_{18}$ alkyl, $C_6$–$C_{10}$ aryl, and —OM, wherein M is a univalent alkali metal; R" is selected from the same group as R' plus hydroxyl; and each $R_1$ is selected from the group consisting of hydrogen, $C_1$–$C_{18}$ alkyl, $C_6$–$C_{10}$ aryl, and $C_1$–$C_{18}$ alkoxy;

(d) 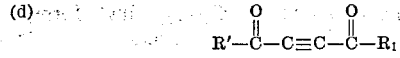

wherein R' and $R_1$ are the same as in (c);

(e) 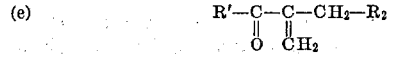

wherein R' is the same as in (c), and $R_2$ is selected from the group consisting of hydrogen, $C_1$–$C_{18}$ alkyl, formyl, $C_6$–$C_{10}$ aryl and carbo-($C_1$–$C_{18}$) alkoxy; and (f) 

wherein R' and $R_1$ are the same as in (c), and (2) a compounded but vulcanized high unsaturated rubber, said vulcanizable blend (1) being adjacent to and in contact with said high unsaturated rubber (2), said adjacent rubbery layers having been cured while in contact with one another at a temperature of between about 250° F. and about 575° F. for between about 1 minute and about 200 minutes.

No references cited.

MORRIS LIEBMAN, *Primary Examiner.*

H. S. KAPLAN, *Assistant Examiner.*